(12) United States Patent
He et al.

(10) Patent No.: US 12,390,896 B2
(45) Date of Patent: Aug. 19, 2025

(54) MANAGEMENT SYSTEM USING A BRIDGE CRANE FOR LOADING AN OBJECT ONTO A MACHINE TOOL AND UNLOADING AN OBJECT FROM THE MACHINE TOOL

(71) Applicant: BUFFALO MACHINERY COMPANY LIMITED, Taichung (TW)

(72) Inventors: Yi-Lin He, Taichung (TW); Hsun-Fu Chiang, Taichung (TW); Chia-Hui Tang, Taichung (TW); Paul Chang, Taichung (TW)

(73) Assignee: Buffalo Machinery Company Limited, Taichung (TW)

( * ) Notice: Subject to any disclaimer, the term of this patent is extended or adjusted under 35 U.S.C. 154(b) by 736 days.

(21) Appl. No.: 17/661,176

(22) Filed: Apr. 28, 2022

(65) Prior Publication Data
US 2023/0173628 A1  Jun. 8, 2023

(51) Int. Cl.
| | |
|---|---|
| *B23Q 7/00* | (2006.01) |
| *B23Q 41/02* | (2006.01) |
| *B66C 1/10* | (2006.01) |
| *B66C 7/02* | (2006.01) |
| *B66C 13/46* | (2006.01) |
| *B66C 17/06* | (2006.01) |

(52) U.S. Cl.
CPC ............ *B23Q 7/005* (2013.01); *B23Q 41/02* (2013.01); *B66C 7/02* (2013.01); *B66C 13/46* (2013.01); *B66C 17/06* (2013.01); *B66C 1/10* (2013.01); *B66C 2700/082* (2013.01)

(58) Field of Classification Search
CPC .......... B23Q 7/005; B23Q 41/02; B66C 7/02; B66C 13/46; B66C 17/06; B66C 1/10; B66C 2700/082; B66C 13/063; B66C 13/48; G05B 19/4189
See application file for complete search history.

(56) References Cited

U.S. PATENT DOCUMENTS

2018/0252921 A1* 9/2018 Rantala .............. G02B 27/0172

FOREIGN PATENT DOCUMENTS

| DE | 1693145 B1 * | 4/2008 | .............. B23Q 1/012 |
| IT | 2277818 A1 * | 1/2011 | ............... B66C 1/06 |
| KR | 101913574 B1 * | 10/2018 | ............... B23Q 7/10 |

* cited by examiner

*Primary Examiner* — Thomas Randazzo
(74) *Attorney, Agent, or Firm* — Rosenberg, Klein & Lee

(57) ABSTRACT

A management system includes: a plurality of machine tools each including a base plate; a plurality of storage plates; an object holder enabling an object to be placed thereon; a conveying unit including a fetching unit that is configured to secure or release said object holder, and a bridge crane that is configured to move the fetching unit among the base plates and the storage plates; and a control unit controlling the bridge crane to move the fetching unit to where the object holder is located, and controlling the fetching unit to secure the object holder, and controlling the bridge crane to move the fetching unit along with the object holder to another location to release the object holder.

11 Claims, 13 Drawing Sheets

MANAGEMENT SYSTEM USING A BRIDGE CRANE FOR LOADING AN OBJECT ONTO A MACHINE TOOL AND UNLOADING AN OBJECT FROM THE MACHINE TOOL

CROSS-REFERENCE TO RELATED APPLICATION

This application claims priority of Taiwanese Patent Application No. 110145496, filed on Dec. 6, 2021.

FIELD

The disclosure relates to a management system using a bridge crane for loading an object onto a machine tool and unloading an object from the machine tool.

BACKGROUND

Conventionally, a manufacturing system includes a plurality of machine tools, a storage unit and a hoist machine. The machine tools are configured for machining a workpiece (e.g., metal or rigid materials) placed thereon, so as to manufacture a machined product. The workpiece may be first placed onto one of the machine tools by an operator who operates the hoist machine to retrieve the workpiece from the storage unit (also known as loading an object onto the machine tool). After the machined product is manufactured, the operator may operate the hoist machine to retrieve the machined product from the one of the machine tools (also known as unloading an object from the machine tool), and to move the machined product to the storage unit. The one of the machine tools then becomes available for machining another workpiece.

It is noted that when the number of machine tools of the manufacturing system becomes large, the operations of loading and unloading becomes complicated and additional operators/hoist machines may be needed.

SUMMARY

Therefore, an object of the disclosure is to provide a management system using a bridge crane for loading an object onto a machine tool and unloading an object from the machine tool.

According to one embodiment of the disclosure, the management system for loading and unloading an object includes:

a plurality of machine tools, each including a base plate;
a storage unit including a plurality of storage plates;
an object holder detachably connected to one of the plurality of base plates and the plurality of storage plates, the object holder being configured to enable an object to be placed thereon;
a conveying unit including
  a fetching unit that is configured to secure or release the object holder, and
  a bridge crane that is configured to move the fetching unit among a plurality of predetermined locations, each of the predetermined locations being associated with one of the base plates and the storage plates; and
a control unit coupled to the plurality of machine tools, the storage unit and the conveying unit, and configured to
  control the bridge crane to move the fetching unit to one of the predetermined locations at which the object holder is located, and control the fetching unit to secure the object holder, and
  control the bridge crane to move the fetching unit along with the object holder to another one of the predetermined locations at which the object holder is to be moved, and control the fetching unit to release the object holder onto one of the base plates and the storage plates.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
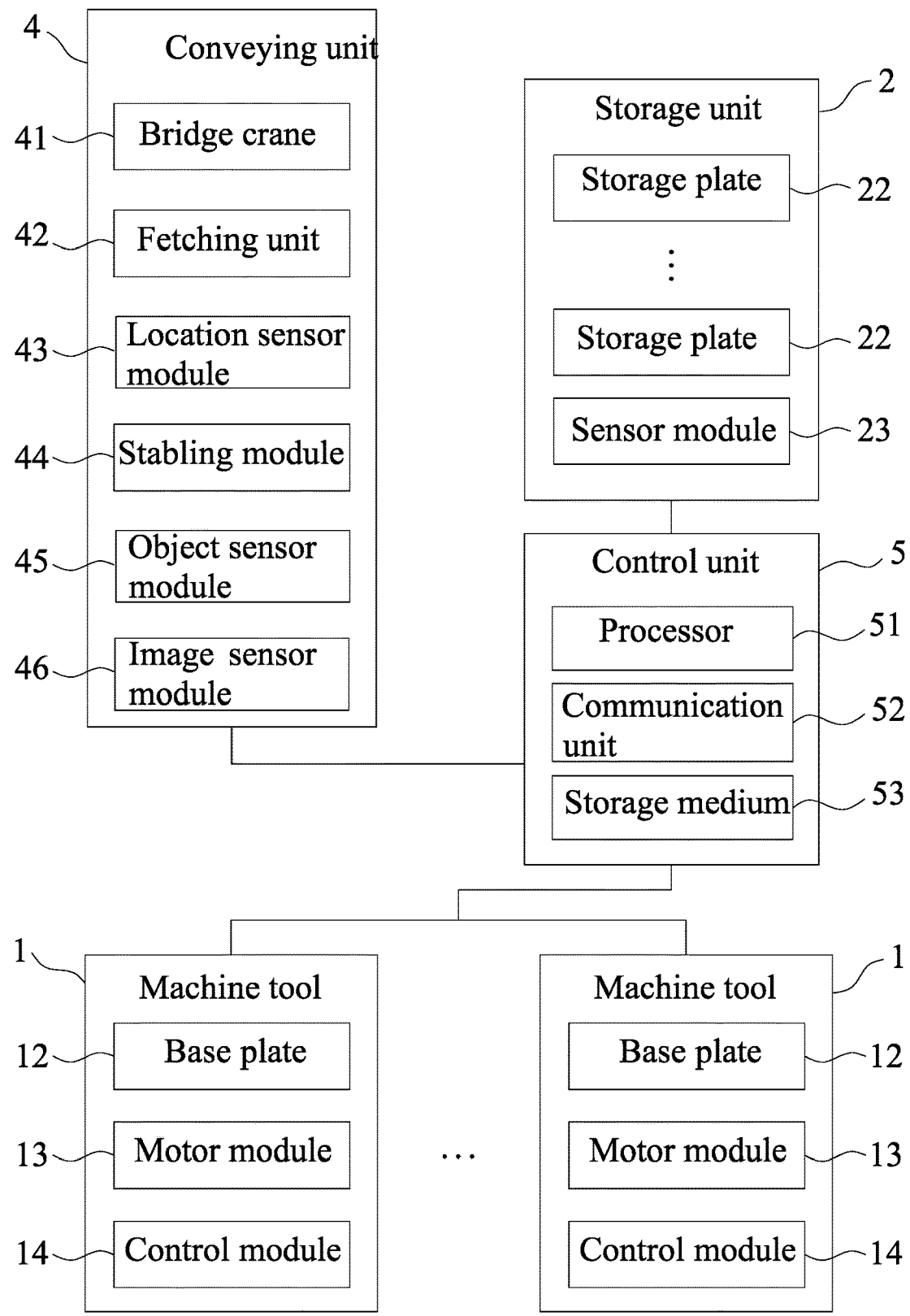
FIG. 1 is a block diagram illustrating a management system according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

Additionally, the terms regarding directions such as "in front of", "behind", "left", "right", "upward", "bottom", etc., are used to express relative positions among different elements as shown in the drawings, and should not be construed in a limiting manner.

Figure 2:
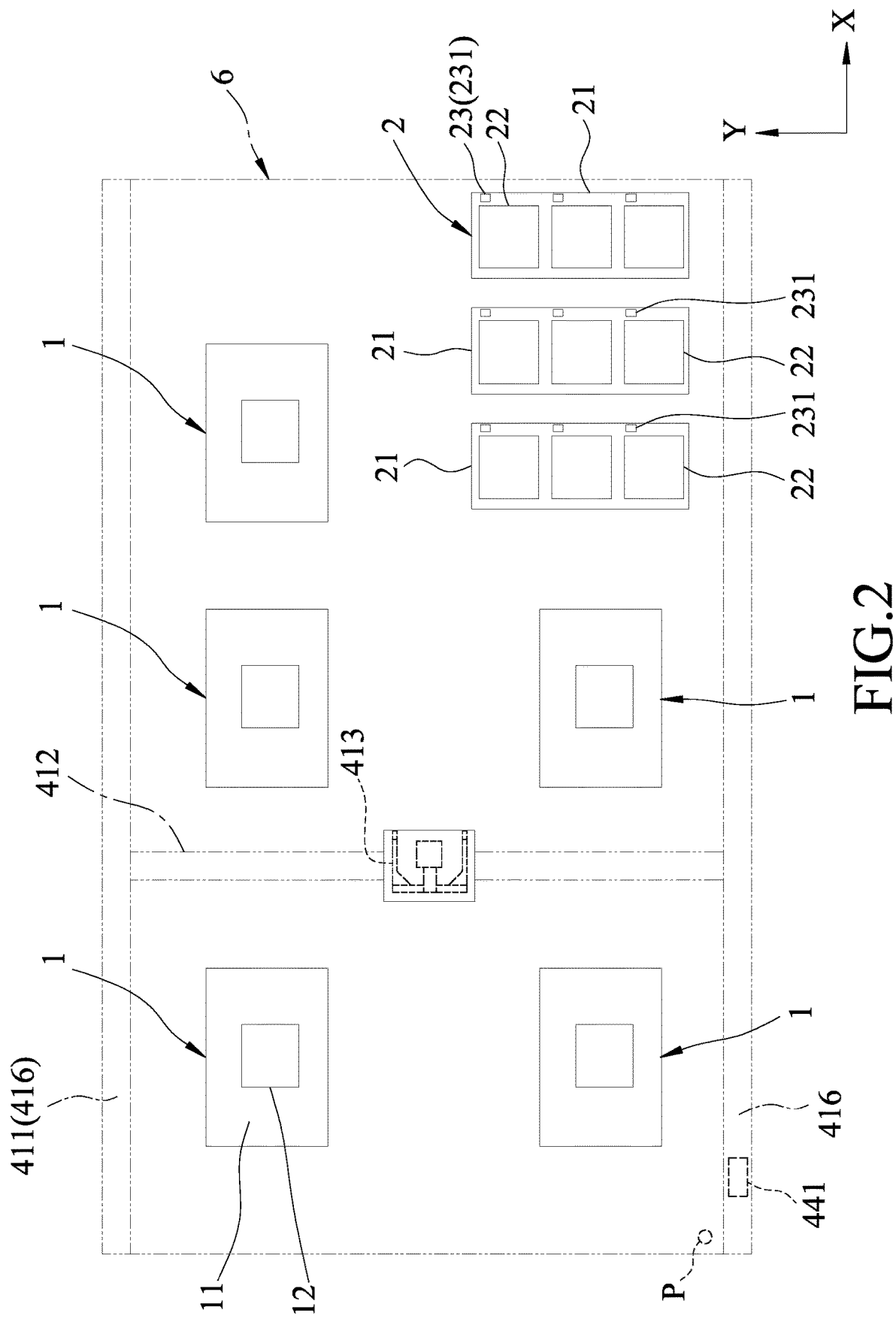
FIG. 2 is a top schematic view of the management system disposed in a factory according to one embodiment of the disclosure.
Figure 3:
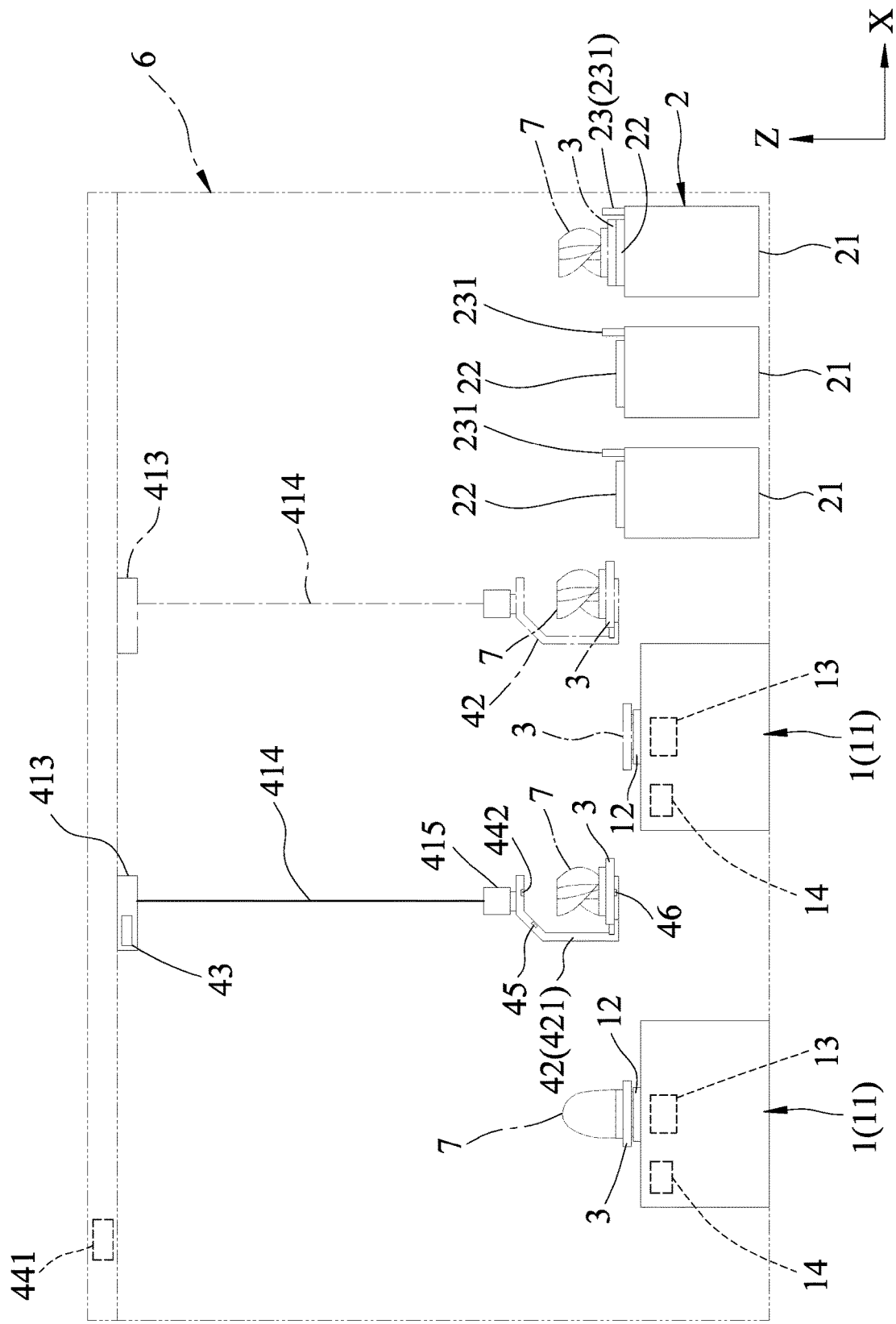
FIG. 3 is a side schematic view of the management system disposed in the factory according to one embodiment of the disclosure.

Referring to FIGS. 1 to 3, a management system according to one embodiment of the disclosure includes a plurality of machine tools 1, a storage unit 2, a plurality of object holders 3, a conveying unit 4 and a control unit 5. The management system in this embodiment may be disposed in a factory 6 and is configured for machining a plurality of objects 7. Each of the objects 7 may be made of metal or rigid materials.

Figure 4:
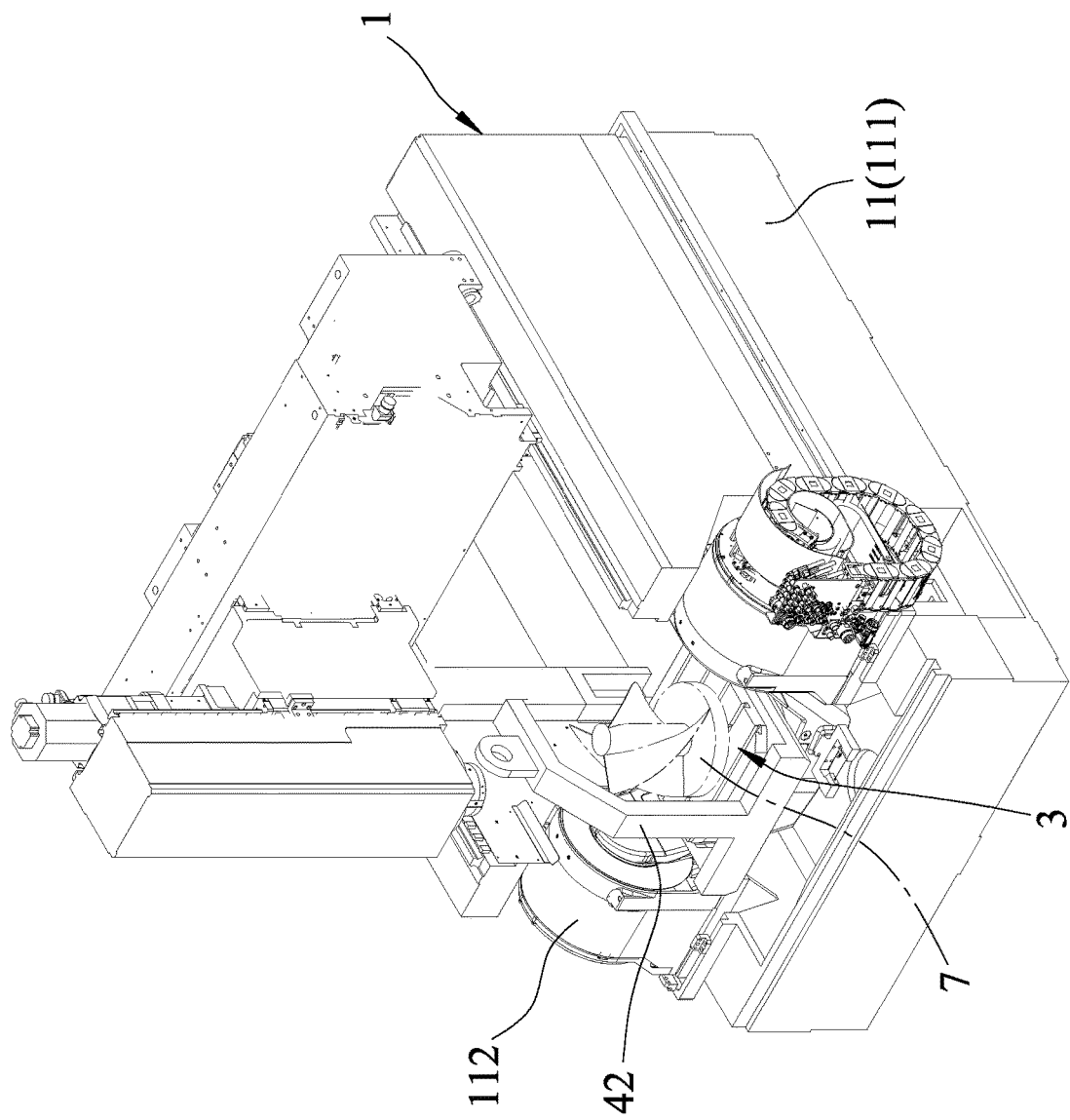
FIG. 4 is a perspective view illustrating a machine tool, a fetching unit and an object holder of the management system, and an object placed on the object holder.
Figure 5:
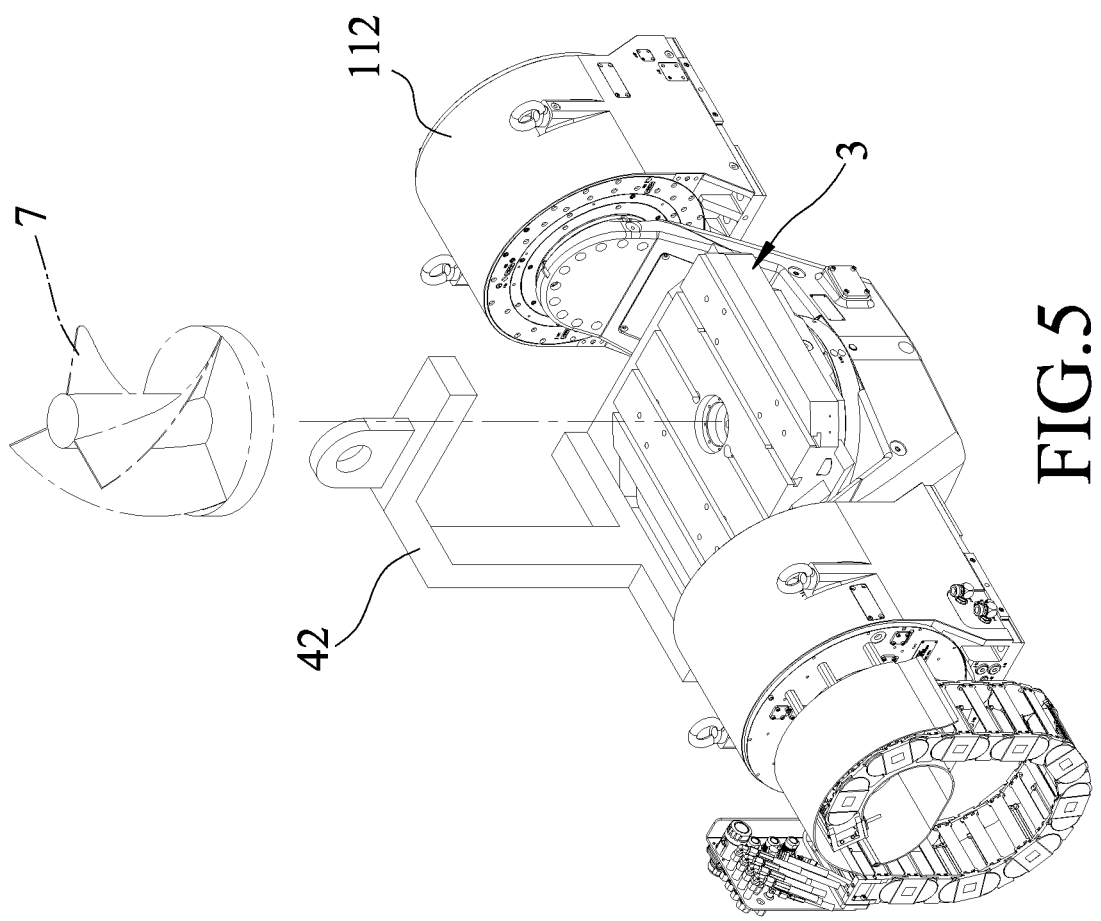
FIG. 5 is a perspective view illustrating a work bench of the machine tool, the fetching unit and the object holder.
Figure 6:
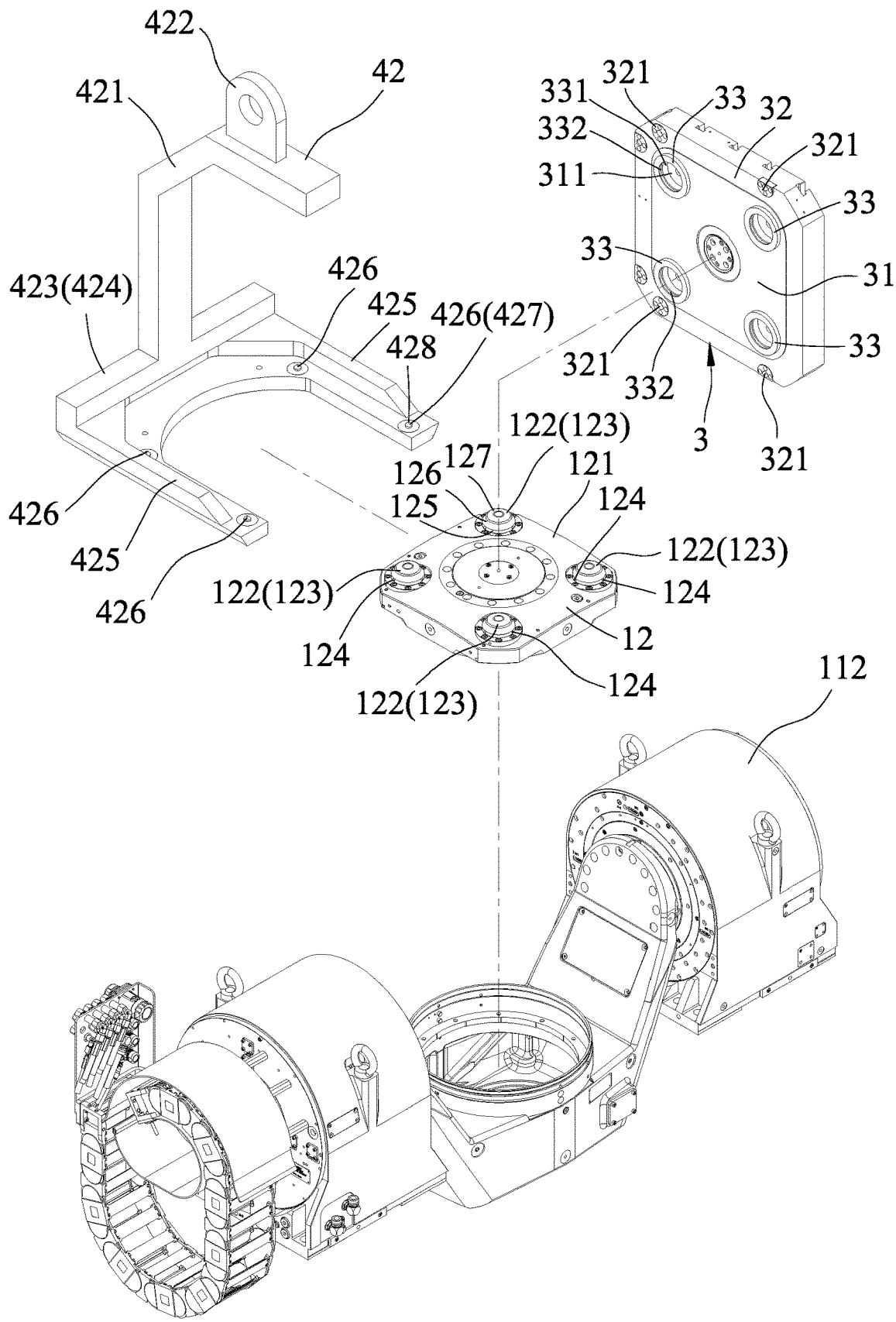
FIG. 6 is a perspective exploded view illustrating a base plate and the object holder.

Further referring to FIGS. 4, 5 and 6, each of the machine tools 1 includes a base 11, a base plate 12, a motor module 13 and a control module 14. It is noted that for the sake of description, FIGS. 4 to 6 and the following accompanying paragraphs only describe one of the machine tools 1, and other machine tools 1 may have structures that are similar to those of the one of the machine tools 1.

The base 11 includes a base seat 111 and a work bench 112 that is disposed on the base seat 111 and that is configured to allow the corresponding base plate 12 to be disposed thereon.

The base plate 12 is configured to allow one of the object holders 3 to be placed thereon, and includes a plate body 121 and four protruding members 122 disposed on the plate body 121. The plate body 121 is configured to be placed on the work bench 112.

Each of the protruding members 122 includes a protruding part 123, and a plurality of balls 124, each being retractably disposed on the protruding part 123 so as to be able to secure one of the object holders 3. The protruding part 123 of each of the protruding members 122 has a first surface 125 that extends upwardly from the plate body 121, a second surface 126 that extends upwardly and inwardly from the first surface 125, and a third surface 127 that extends upwardly and inwardly from the second surface 126. The plurality of balls 124 may be disposed on the first surface 125, spaced apart from one another. While in this embodiment, four balls 124 are present, in other embodiments, other number of balls 124 (e.g., 2, 3, 5, etc.) may be present.

The motor module 13, which may be embodied using a motor, is configured to actuate the base plate 12 to rotate. The control module 14 is connected to the motor module 13 and the control unit 5, and is configured, in response to receipt of a command signal from the control unit 5, to control the operations of the motor module 13. The control module 14 and the control unit 5 may include microprocessors to execute the above functions. It is noted that in some embodiments, the balls 124 may be connected to a mechanism (not depicted in the drawings) which may be controlled by the control module 14 to move the balls 124.

Referring back to FIGS. 2 and 3, the storage unit 2 includes a plurality of racks 21, a plurality of storage plates 22 and a sensor module 23. Each of the racks 21 may allow multiple ones of storage plates 22 to be disposed thereon.

In this embodiment, the storage plates 22 may have a structure that is identical to that of the base plates 12 as shown in FIG. 6 (that is to say, each of the storage plates 22 may include four balls 124 for securing one of the object holders 3 thereon), but is not limited to such. In other embodiments, other mechanisms may be employed on the storage plates 22 so as to secure one of the object holders 3.

The sensor module 23 includes a plurality of sensors 231, each being placed on one of the racks 21 and associated with a corresponding one of the storage plates 22 and being connected with the control unit 5. In one example of FIG. 2, each of the racks 21 may allow three storage plates 22 to be placed thereon, and three sensors 231 are present on each of the racks 21. Each of the sensors 231 may be embodied using a photoelectric sensor, a proximity sensor, a camera, etc. In use, each of the sensors 231 is configured to detect whether the corresponding one of the storage plates 22 has one of the object holders 3 placed thereon.

Each of the object holders 3 may be detachably connected to one of the plurality of base plates 12 or one of the plurality of storage plates 22. Each of the object holders 3 is configured to enable an object 7 to be placed thereon. It is noted that while in this embodiment, a plurality of object holders 3 are present, in some embodiments, it may be the case that only one object holder 3 is present.

FIGS. 5 and 6 depict one exemplary object holder 3. The object holder 3 includes an inner part 31, an outer part 32 that surrounds the inner part 31, and four engaging parts 33 that are disposed on the inner part 31.

Specifically, the inner part 31 is formed with four locating holes 311 (only one is labeled) in a bottom surface thereof, and the outer part 32 is formed with four grooves 321 in a bottom surface thereof. The four engaging parts 33 are located in the four locating holes 311, respectively, to be connected to the inner part 31. It should be noted that the bottom surface of the inner part 31 and the bottom surface of the outer part 32 are each a surface facing the base plate 12 when the object holder 3 is placed on the base plate 12.

Each of the four engaging parts 33 has a cylinder shape, and has an inner surface 331 which is formed with a ring-shaped groove 332. In this manner, the object holder 3 may be secured onto one of the base plates 12 by engaging the protruding members 122 respectively to the engaging parts 33.

It is noted that while in this embodiment, four protruding members 122, four locating holes 311 and four engaging parts 33 are present, in other embodiments, other numbers of protruding members 122, locating holes 311 and engaging parts 33 (e.g., 2, 3, 5, etc.) may be present.

Referring back to FIGS. 1 to 3, the conveying unit 4 includes a bridge crane 41, a fetching unit 42, a location sensor module 43, a stabilizing module 44, an object sensor module 45, and an image sensor module 46.

The bridge crane 41 includes a first track 411, a second track 412, a dropping member 413, a cable 414 and a hanging member 415.

The first track 411 is built in the factory 6 at a position that is above the machine tools 1 and the storage unit 2, and includes a plurality of stationary tracks 416 (two of which are shown in FIG. 2) that extend along a first horizontal direction which is parallel to the ground of the factory 6 (i.e., the direction X as indicated in FIGS. 2 and 3).

The second track 412 extends along a second horizontal direction that is parallel to the ground of the factory 6 and perpendicular to the direction X (i.e., the direction Y as indicated in FIG. 2) and interconnects the two stationary tracks 416. In use, the second track 412 is configured to be slidably movable along the direction X.

The dropping member 413 is connected to the second track 412, and is configured to be movable along the second track 412.

The cable 414 has one end connected to the dropping member 413 and another end connected to the hanging member 415 (e.g., a spreader), and may be controlled to extend from the dropping member 413 vertically downward or retract along a vertical direction that is perpendicular to the ground of the factory 6 (i.e., the direction Z as indicated in FIG. 3).

The fetching unit 42 is removably connected to the hanging member 415. That is to say, the fetching unit 42 may be driven by the bridge crane 41 to move to different locations.

Further referring to FIGS. 5 and 6, the fetching unit 42 includes a frame 421 that has two ends opposite to each other in the direction Z, a buckle 422 that is disposed on one end of the frame 421 for connecting the fetching unit 42 to the hanging member 415, and a fork structure 423 that extends from another end of the frame 421 and that is for holding one of the object holders 3.

The fork structure 423 includes a connecting body 424 that is connected to the another end of the frame 421, two branches 425 that extend in parallel from two opposite ends of the connecting body 424, and four protrusions 426 that are formed on the branches 425. In this embodiment, each of the protrusions 426 is substantially shaped in a conical frustum, and includes a surrounding inclined surface 427 that extends upwardly and inwardly from a corresponding one of the branches 425, and a top flat surface 428 that is connected to the surrounding inclined surface 427. It is noted that in other embodiments, the protrusions 426 may have other shapes.

The branches 425 and the protrusions 426 are configured in a manner such that when one of the object holders 3 is disposed on the fork structure 423 (e.g., when the fetching unit 42 is at a pick-up location), the four protrusions 426 of the fork structure 423 engage the four grooves 321 of the one of the object holders 3, respectively.

It is noted while in this embodiment, four grooves 321 and four protrusions 426 are present, in other embodiments, other numbers of grooves 321 and protrusions 426 may be present.

Referring back to FIGS. 2 and 3, the location sensor module 43 is connected to the control unit 5, is disposed on the dropping member 413, and is configured to detect a current location of the fetching unit 42. In this embodiment, the location sensor module 43 is embodied using a laser rangefinder, and may be embodied using other rangefinders in different embodiments.

In use, the location sensor module 43 may be configured to detect a horizontal distance and a relative direction to a reference object (P) in the factory 6 in order to determine two distances to the reference object (P) with respect to the directions X and Y, respectively, and to detect a drop distance of the fetching unit 42 from the dropping member 413 in the direction Z, so as to determine the current location of the fetching unit 42, which may be represented in the form of a set of coordinates that includes three coordinate (x, y, z) in a three-dimensional coordinate system constituted by the directions X, Y and Z. It is noted that the coordinates x and y are determined based on the distances to the reference object (P) with respect to the directions X and Y, and the coordinate z is determined based on the drop distance. The current location of the fetching unit 42 may then be transmitted to the control unit 5.

The stabilizing module 44 includes a controlling mechanism 441 disposed on one of the stationary tracks 416 of the first track 411 and connected to the control unit 5, and an oscillation detecting module 442 disposed on the frame 421 of the fetching unit 42 and connected to the control unit 5. In use, the oscillation detecting module 442 is configured to detect movement of the fetching unit 42 and to calculate an oscillation parameter based on the movement. In this embodiment, the controlling mechanism 441 includes a microprocessor, and the oscillation detecting module 442 includes an accelerometer that is configured to detect the movement of the fetching unit 42 (and therefore an acceleration within a three-dimensional coordinate system), and a microprocessor that is configured to calculate the oscillation parameter by calculating a double integral calculation of the acceleration (with respect to time). In other embodiments, the oscillation detecting module 442 may include a camera to detect the movement of the fetching unit 42, and a microprocessor to calculate the oscillation parameter. The oscillation parameter may then be transmitted to the control unit 5.

The object sensor module 45 is disposed on the frame 421 of the fetching unit 42, and is connected to the control unit 5. In use, the object sensor module 45 is configured to determine whether one of the object holders 3 (and an object 7 thereon) is placed on the fetching unit 42. In this embodiment, the object sensor module 45 includes a photoelectric sensor, and may include a proximity sensor in other embodiments.

The image sensor module 46 is disposed on the fork structure 423 of the fetching unit 42, and is connected to the control unit 5. In this embodiment, the image sensor module 46 may be embodied using a camera.

The control unit 5 may be embodied using a personal computer, a server device, or other computing devices. The control unit 5 includes a processor 51, a communication unit 52 and a data storage medium 53.

The processor 51 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), and/or the like.

The communication unit 52 may include at least one of a radio-frequency integrated circuit (RFIC), a short-range wireless communication module supporting a short-range wireless communication network using a wireless technology of Bluetooth® and/or Wi-Fi, etc., or a mobile communication module supporting telecommunication using Long-Term Evolution (LTE), the third generation (3G) and/or fifth generation (5G) of wireless mobile telecommunications technology, and/or the like. Using the communication unit 52, the control unit 5 is configured to establish communication with the components of the machine tools 1, the storage unit 2, and the conveying unit 4.

The data storage medium 53 may be embodied using, for example, random access memory (RAM), read only memory (ROM), programmable ROM (PROM), firmware, flash memory, etc. In this embodiment, the data storage medium 53 stores a software application therein. The software application may be an advanced process control (APC) system, an enterprise resource planning (ERP) system, a manufacturing execution system (MES) or other application, and includes instructions that, when executed by the processor 51, cause the processor 51 to perform the operations as described below.

In this embodiment, the data storage medium 53 also stores a plurality of location datasets each being associated with a location of one of the base plates 12 or the storage plates 22, a plurality of working datasets each including a current location of a respective one of the object holders 3 and a status of an object 7 thereon, a plurality of base plate datasets each being associated with a state of a respective one of the base plates 12 regarding whether one of the object holders 3 is placed thereon, and a plurality storage datasets each being associated with a state of a respective one of the storage plates 22 regarding whether one of the object holders 3 is placed thereon. When any one of the location of one of the object holders 3, a status of an object 7 on the one of the object holders 3, and a state of one of the base plates 12 or one of the storage plates 22 changes, the corresponding dataset stored in the data storage medium 53 may be updated by the processor 51 and then stored in the data storage medium 53.

Each of the location datasets includes a standard coordinate set, a dropping coordinate set, and a pick-up coordinate set.

Using the location dataset retrieved from the storage medium 53, the control unit 5 is configured to control the bridge crane 41 to move the fetching unit 42 among a plurality of predetermined locations, each of the predetermined locations being associated with one of the base plates 12 and the storage plates 22. Specifically, each of the predetermined locations is indicated by the standard coordinate set included in the corresponding location dataset. That is to say, the plurality of standard coordinate sets included respectively in the location datasets correspond with the predetermined locations, respectively.

In this manner, the control unit 5 is configured to control the bridge crane 41 to move the fetching unit 42 to one of the predetermined locations at which one of the object holders 3 is located, to control the fetching unit 42 to secure the one of the object holders 3, to control the bridge crane 41 to move the fetching unit 42 along with the one of the object holders 3 to another one of the predetermined locations to which the one of the object holders 3 is to be moved, and to control the fetching unit 42 to release the one of the object holders 3 onto one of the base plates 12 and the storage plates 22 at said another one of the predetermined locations.

Specifically, the fetching unit 42 may be controlled by the operations of the bridge crane 41 to move to one of a plurality of dropping locations that is associated with the one of the predetermined locations (and indicated by the dropping coordinate set of the corresponding location dataset), or to one of a plurality of pick-up locations that is associated with the one of the predetermined locations and that is higher than the corresponding one of dropping locations (and indicated by the pick-up coordinate set coordinate set of the corresponding location dataset). It is noted that for each one of the base plates 12 and the storage plates 22, a predetermined location, a dropping location and a pick-up location are present, and each of the predetermined location, the dropping location and the pick-up location is associated with the one of the base plates 12 and the storage plates 22 and associated with one another.

Figure 7:
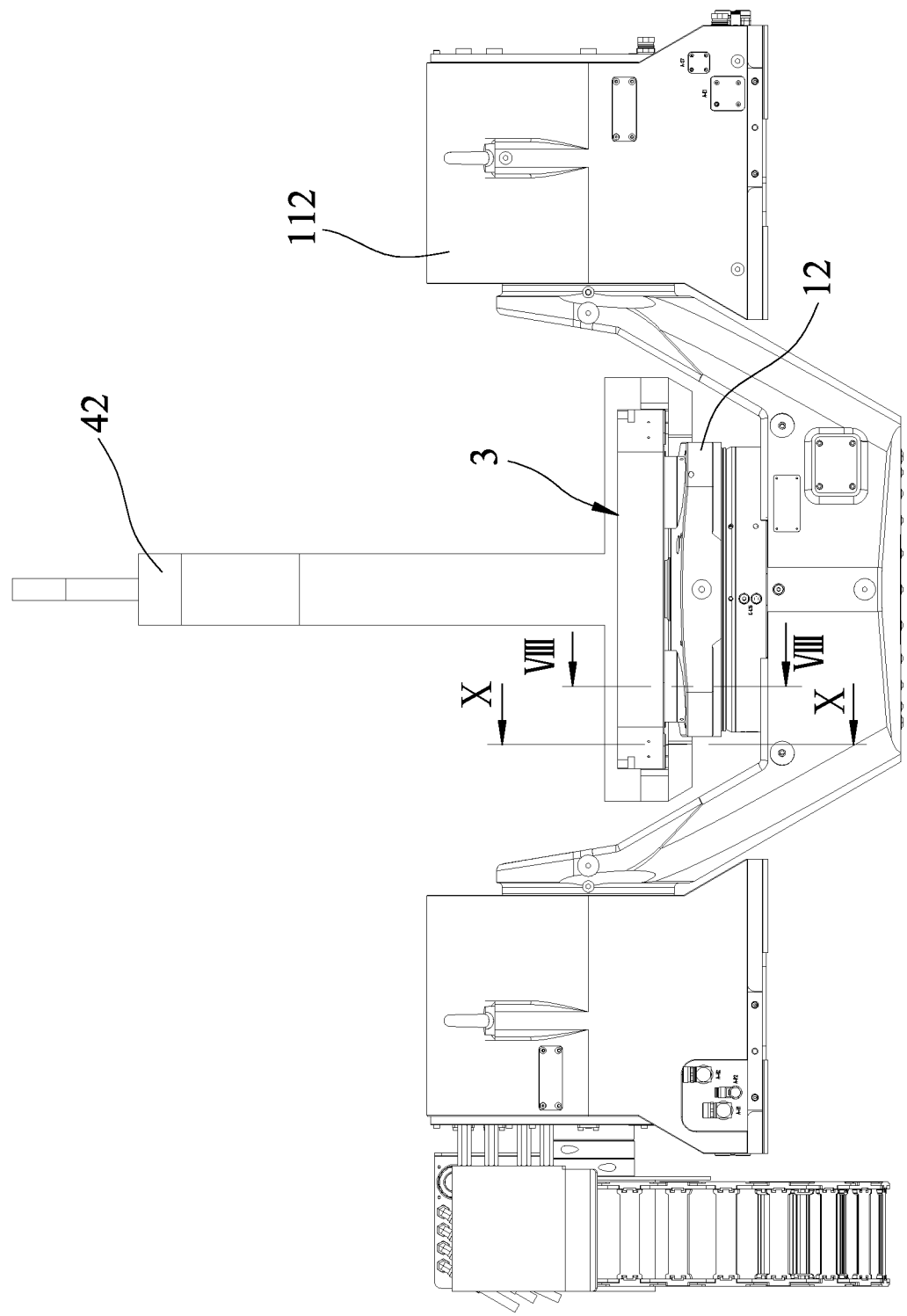
FIG. 7 is a side view illustrating the fetching unit being at a predetermined location associated with one of multiple base plates.
Figure 8:
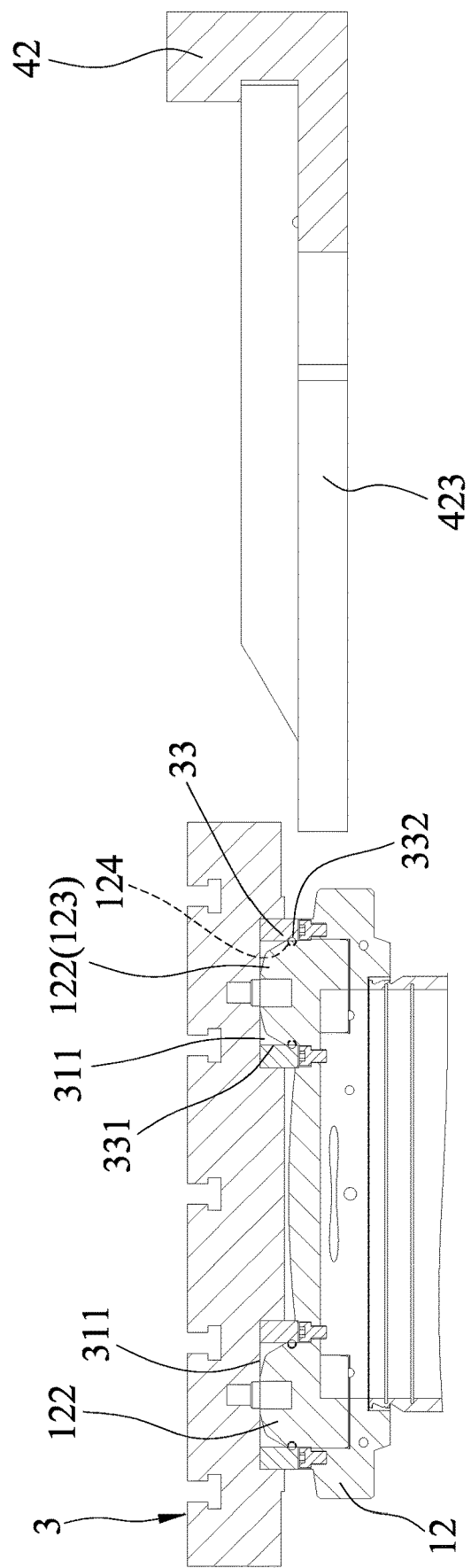
FIG. 8 is a sectional view taken along line VIII-VIII in FIG. 7.

FIG. 7 is a side view illustrating the fetching unit 42 being in one of the predetermined locations associated with one of the base plates 12. FIG. 8 is a sectional view taken along the line VIII-VIII of FIG. 7.

In the example of FIG. 8, the base plate 12 has one object holder 3 thereon. In this case, the protruding members 122 of the base plate 12 extend into the locating holes 311, respectively, so as to removably secure the object holder 3 on the base plate 12. Additionally, the balls 124 on each of the protruding members 122 engage a corresponding one of the ring-shaped grooves 332.

Figure 9:
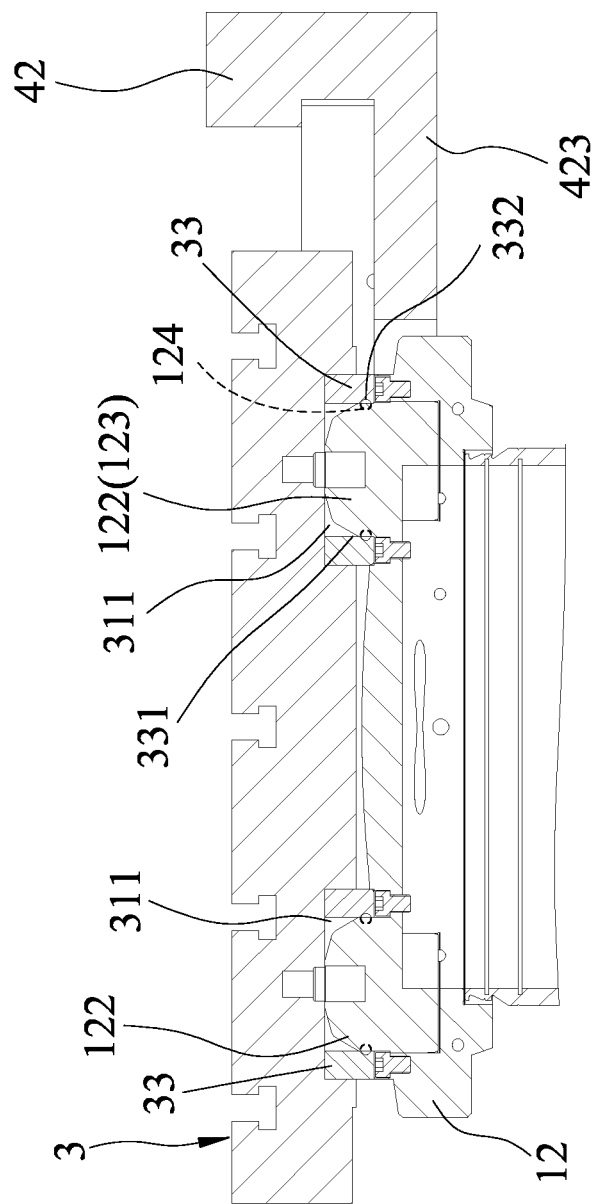
FIG. 9 is a sectional view similar to FIG. 8, illustrating the fetching unit being moved to a corresponding dropping location associated with the one of the base plates.
Figure 10:
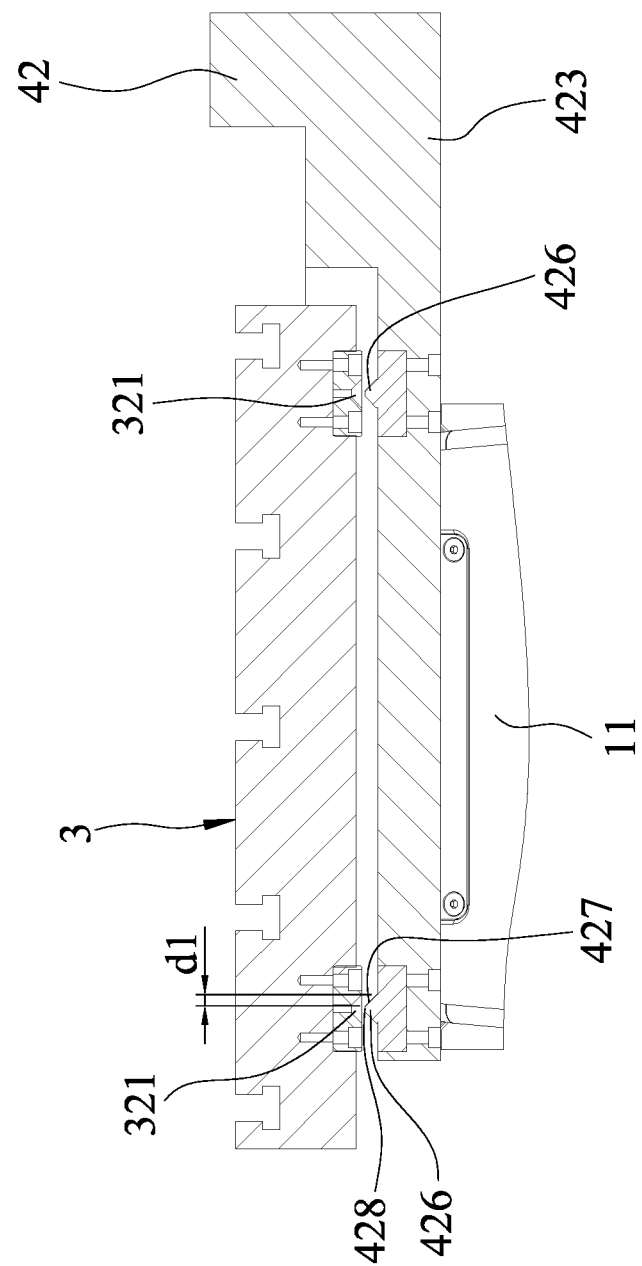
FIG. 10 is a sectional view taken along line X-X in FIG. 7.

FIG. 9 is a sectional view similar to FIG. 8, and illustrates the fetching unit 42 being moved to the corresponding dropping location associated with the base plate 12. FIG. 10 is a sectional view taken along the line X-X of FIG. 7.

In this embodiment, the second track 412 is controlled to move the fetching unit 42 horizontally from the predetermined location to the dropping location (i.e., horizontally toward the base plate 12).

At this stage, as shown in FIG. 9, the fork structure 423 of the fetching unit 42 arrived at a position that is directly below the object holder 3, with the protrusions 426 being directly below the grooves 321, respectively. At this stage, the fork structure 423 is also spaced apart from the object holder 3 in the vertical direction. As shown in FIG. 10, a first allowance d1 is defined as a horizontal distance between a boundary that defines the cone surface 427 and the flat surface 428 of one of the protrusions 426 and an edge that defines the corresponding one of the grooves 321.

Figure 11:
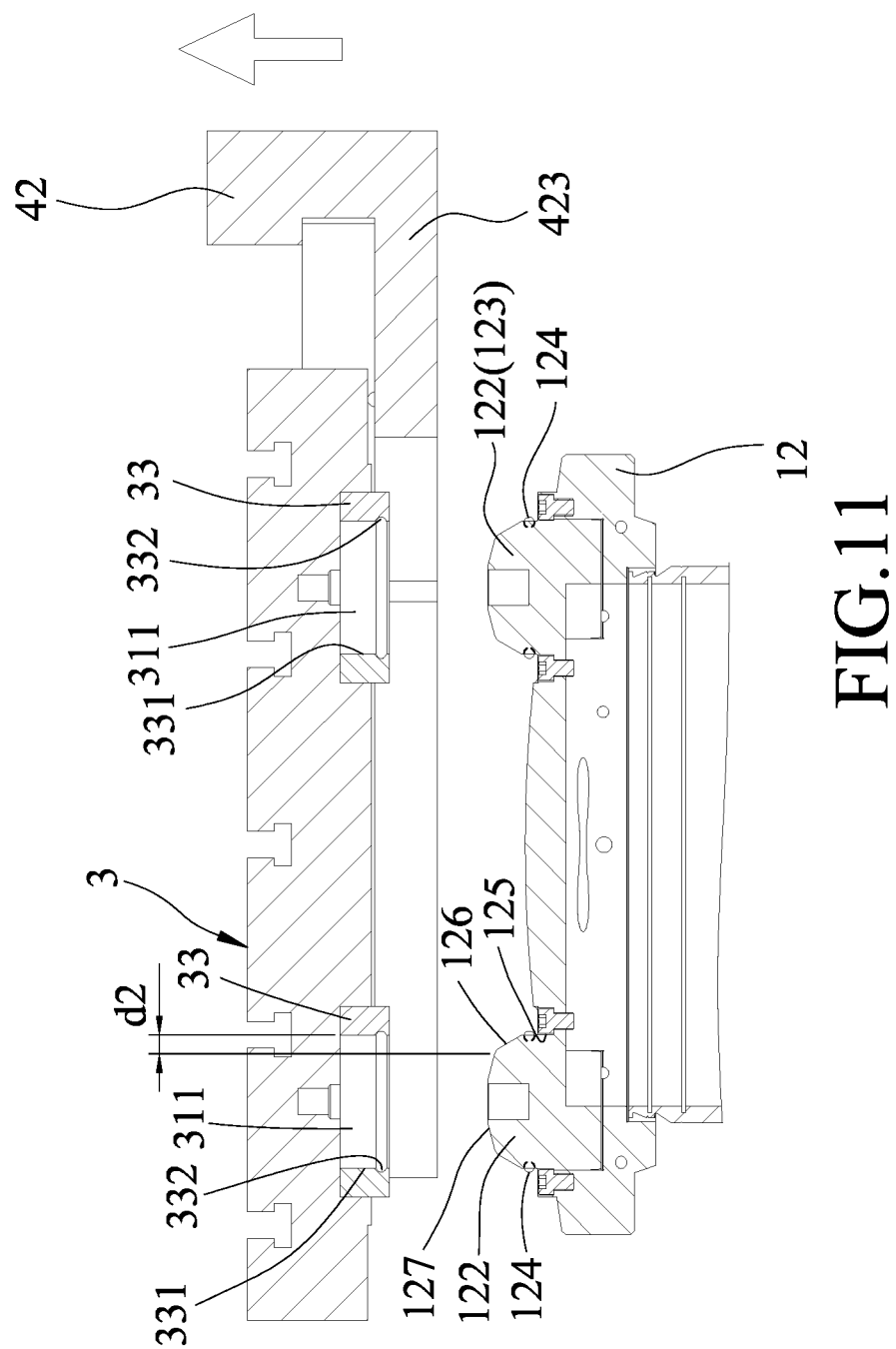
FIG. 11 is a sectional view similar to FIG. 9, illustrating the fetching unit being moved to a corresponding pick-up location associated with the one of the base plates.
Figure 12:
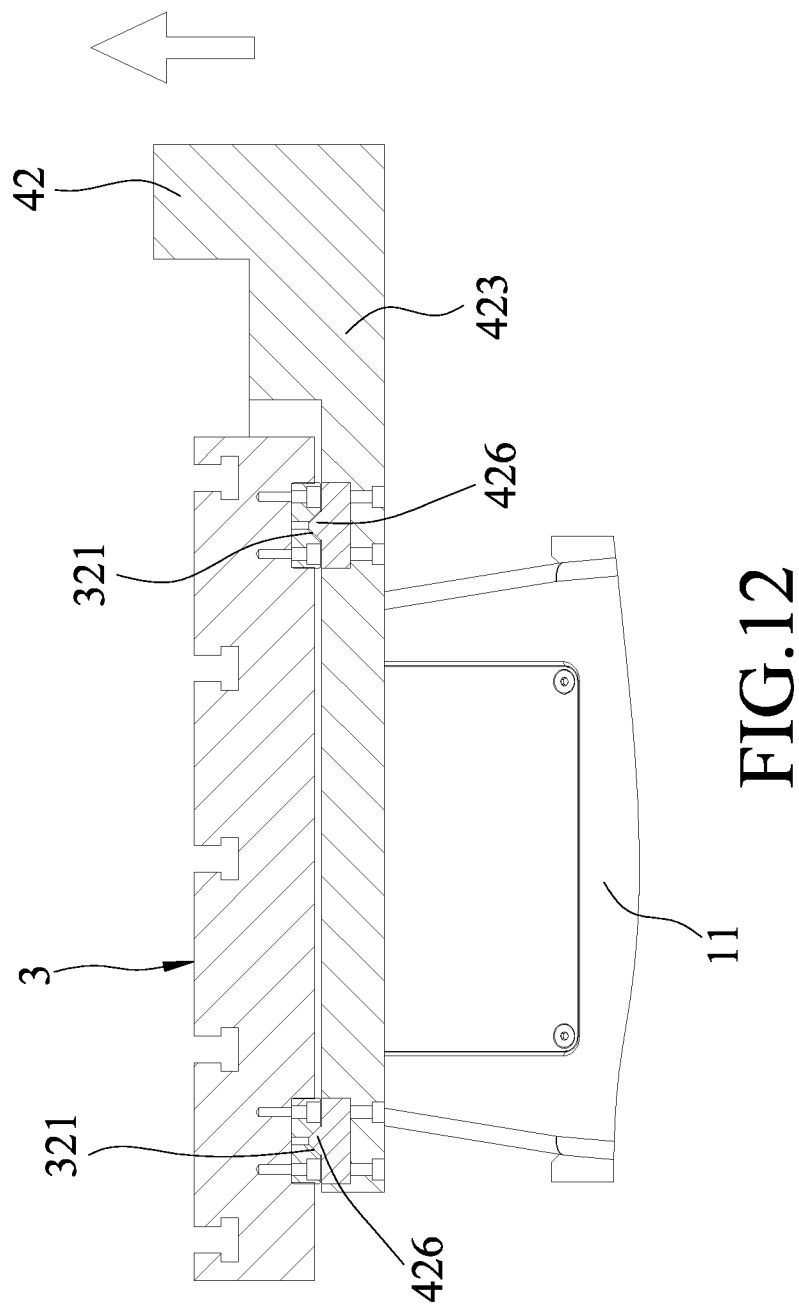
FIG. 12 is a sectional view similar to FIG. 10, but with the fetching unit being moved to the corresponding pick-up location.

FIG. 11 is a sectional view similar to FIG. 8, and illustrates the fetching unit 42 being moved to the corresponding pick-up location associated with the base plate 12. FIG. 12 is a sectional view similar to FIG. 10, but with the fetching unit 42 being moved to the corresponding pick-up location.

In this embodiment, the dropping member 413 is controlled to retract the cable 414. The fork structure 423 is then lifted up to lift the object holder 3.

At this stage, the balls 124 of the base plate 12 are controlled to retract, so as to disengage the corresponding one of the ring-shaped grooves 332, and the protrusions 426 are moved up to engage the grooves 321, respectively. As such, the object holder 3 is detached from the base plate 12. As shown in FIG. 11, a second allowance d2 is defined as a horizontal distance between a boundary that defines the third surface 127 and the second surface 126 of one of the protruding members 122 and an edge that defines the inner surface 331 of the corresponding one of the engaging parts 33.

Then, the fetching unit 42, bringing together the object holder 3, is lifted vertically from the dropping location to the pick-up location away from the base plate 12.

In brief, in the case where it is intended to retrieve one of the object holders 3 currently placed on one of the base plates 12, the processing unit 5 is configured to control the bridge crane 41 to move the fetching unit 42 to one of the predetermined locations that is associated with the one of the base plates 12, to move the fetching unit 42 to a corresponding dropping location, and then to move the fetching unit 42 up to a corresponding pick-up location.

On the other hand, in the case that the fetching unit 42 is currently carrying one of the object holders 3, and it is intended to place the one of the object holders 3 onto another one of the base plates 12, the processing unit 5 is configured to control the bridge crane 41 to move the fetching unit 42 to one of the predetermined locations that is associated with the another one of the base plates 12, to move the fetching unit 42 to a corresponding pick-up location, and then to move the fetching unit 42 down to a corresponding dropping location.

While the above operations are performed with respect to one of the base plates 12, it is noted that the operations may also be performed with respect to one of the storage plates 22 in a similar or identical manner, and details thereof are not repeated for the sake of brevity.

In some embodiments, in the operations of placing the object holder 3 onto another one of the base plates 12, the image sensor module 46 may be activated to capture images near the fork structure 423 (i.e., the images of the locating holes 311, the engaging parts 33, and the protruding members 122), and to transmit the images to the control unit 5. In response, the control unit 5 transmits a command to the control module 14, so as to control the motor module 13 to rotate the base plate 12 to make the protruding members 122 align with the locating holes 311, respectively. As such, the fetching unit 42 may be moved from the pick-up location down to the dropping location, and the object holder 3 may be secured onto the another one of base plates 12. In this manner, the potential issue of the object holder 3 being improperly placed onto the another one of base plates 12 may be eliminated.

Referring back to FIGS. 2 and 3, in some embodiments, after the fetching unit 42 is moved to one of the predetermined locations, one of the pick-up locations or one of the dropping locations, the oscillation detecting module 442 of the stabilizing module 44 may be configured to determine the movement of the fetching unit 42 and to calculate the oscillation parameter based on the movement. When it is determined that the oscillation parameter is larger than a preset threshold, the controlling mechanism 441 may be configured to control the second track 412 and the dropping member 413 to move the fetching unit 42 in a moving direction detected by the oscillation detecting module 442, so as to reduce tension the cable 414 is subjected to. The oscillation detecting module 442 may continue to calculate the oscillation parameter until the oscillation parameter drops below the preset threshold (i.e., the fetching unit 42 is considered to be stabilized).

It is noted that the preset threshold may be different depending on whether the fetching unit 42 is moved to one of the predetermined locations, one of the pick-up locations or one of the dropping locations. In this embodiment, when the fetching unit 42 is moved to one of the predetermined locations or one of the dropping locations, the preset threshold may be a number associated with the first allowance d1. When the fetching unit 42 is moved to one of the pick-up locations, the preset threshold may be a number associated with the second allowance d2.

Afterward, the control unit 5 may control the fetching unit 42 to continue the operations while the possibility of the fetching unit 42 colliding with the machine tools 1 or the racks 21 due to the oscillation is eliminated.

Furthermore, the control module 14 is configured to detect, for each of those of the object holders 3 that are each disposed on a corresponding one of the base plates 12, a current location of the object holder 3 and a status of the object 7 thereon. The sensor module 23 is configured to detect, for each of those of the object holders 3 that are each disposed on a corresponding one of the storage plates 22, a current location of the object holder 3 and a status of the object 7 thereon. It is noted that the status of the object 7 may be one of "not processed" and "processed".

The detected data from the control module 14 and the sensor module 23 is then transmitted to the control unit 5. It is noted that in some embodiments, part of the data (e.g., the status of the objects 7) may be manually inputted by a user operating a user interface (not depicted in the drawings).

That is to say, for each object holder 3, the control unit 5 receives a working dataset including a current location of the object holder 3 and a status of the object 7 thereon, a plurality of base plate datasets each being associated with a state of one of the base plates 12 regarding whether the object holder 3 is placed thereon, and a plurality storage datasets each being associated with a state of one of the storage plates 22 regarding whether the object holder 3 is placed thereon.

With respect to each object holder 3, in response to receipt of the above datasets, the control unit 5 is configured to operate, based on the working dataset, the plurality of base plate datasets and the plurality of storage datasets, in one of the a first mode, a second mode and a third mode.

Specifically, when the working dataset, the plurality of base plate datasets and the plurality storage datasets indicate that the object holder 3 is placed on one of the base plates 12, that the object 7 has been processed, and that one of the storage plates 22 is available for placing the object holder 3, the control unit 5 operates in a first mode.

In the first mode, the control unit 5 controls the bridge crane 41 to: move the fetching unit 42 to the one of the base plates 12 at which the object holder 3 is located; control the fetching unit 42 to secure the object holder 3; move the fetching unit 42 along with the object holder 3 to the one of the storage plates 22; and control the fetching unit 42 to release the object holder 3 onto the one of the storage plates 22.

Figure 13:
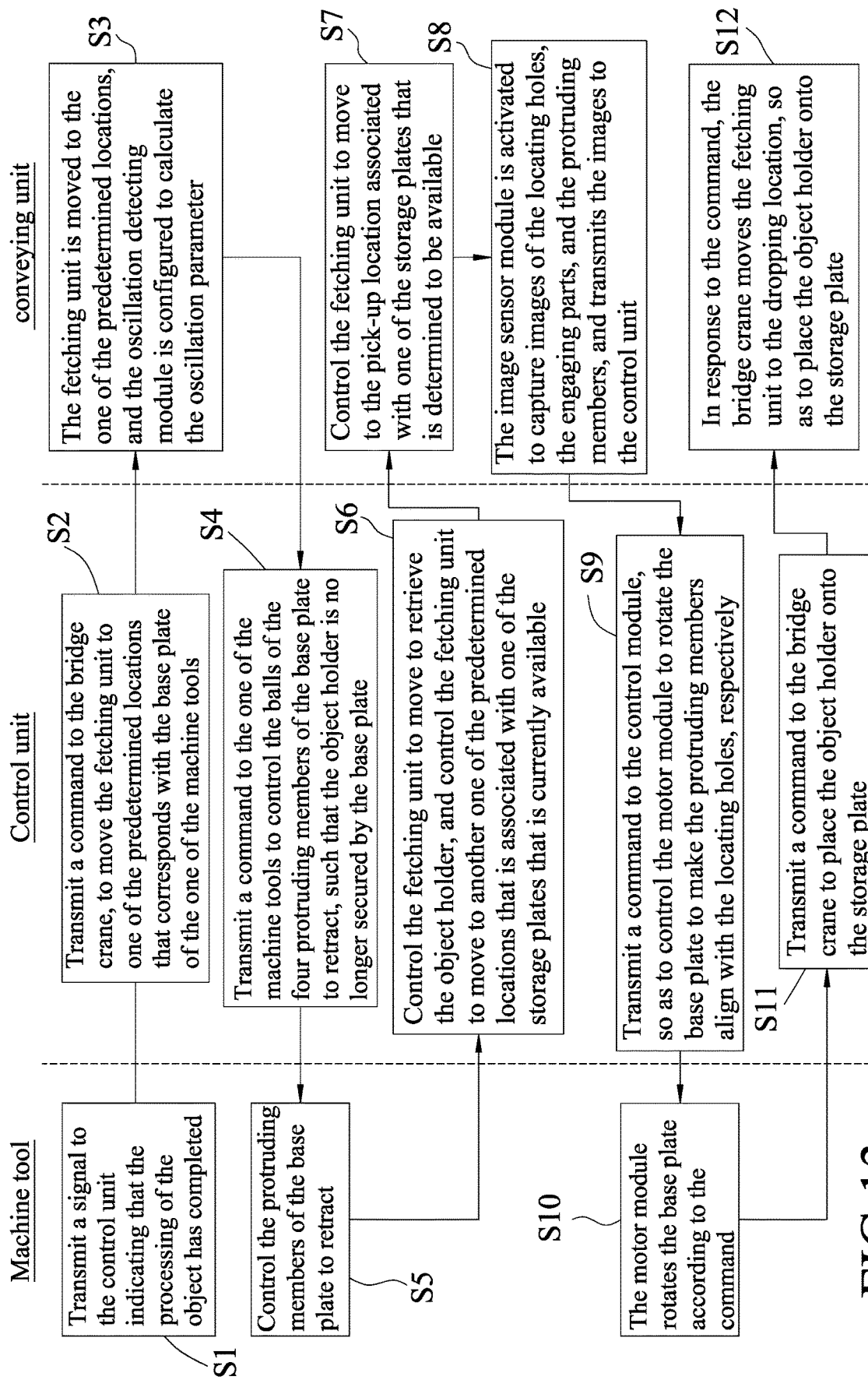
FIG. 13 is a flow chart illustrating steps of operations of a first mode of a control unit according to one embodiment of the disclosure.

FIG. 13 is a flow chart illustrating steps of the operations of the first mode according to one embodiment of the disclosure.

In step S1, after one of the machine tools 1 has completed the processing of the object 7 placed on the base plate 12 thereof, the control module 14 of the one of the machine tools 1 transmits a signal to the control unit 5 indicating that the processing of the object 7 has completed.

Then, in step S2, the control unit 5 transmits a command to the bridge crane 41 to move the fetching unit 42 to one of the predetermined locations that corresponds with the base plate 12 of the one of the machine tools 1.

In response, in step S3, the fetching unit 42 is moved to the one of the predetermined locations, and the oscillation detecting module 442 is configured to calculate the oscillation parameter, and in the case the oscillation parameter is higher than the preset threshold, the controlling mechanism 441 may be configured to control the movement of the fetching unit 42 so as to reduce a tension the cable 414 is subjected to, and the flow proceeds to step S4 when the oscillation parameter drops below the preset threshold.

In step S4, the control unit 5 transmits a command to the one of the machine tools 1 to control the balls 124 of the four protruding members 122 of the base plate 12 to retract, such that the object holder 3 is no longer secured by the base plate 12.

In response, in step S5, the control module 14 of the one of the machine tools 1 controls the four protruding members 122 of the base plate 12 to retract.

Then, in step S6, the control unit 5 controls the fetching unit 42 to move to the dropping location below the object holder 3 and then to move to the pick-up location so as to retrieve the object holder 3, and controls the bridge crane 41 to move the fetching unit 42 to another one of the predetermined locations that is associated with one of the storage plates 22 that is currently available (i.e., there is no object holder placed thereon).

In step S7, the control unit 5 controls the fetching unit 42 to move to the pick-up location associated with one of the storage plates 22 that is determined to be available.

In step S8, the image sensor module 46 is activated to capture images of the locating holes 311, the engaging parts 33, and the protruding members 122, and transmits the images to the control unit 5.

In step S9, in response to receipt of the images, the control unit 5 transmits a command to the control module 14, so as to control the motor module 13 to rotate the base plate 12 to make the protruding members 122 align with the locating holes 311, respectively.

In step S10, in response to the command, the motor module 13 rotates the base plate 12 according to the command.

In step S11, the control unit 5 transmits a command to the bridge crane 41 to place the object holder 3 onto the storage plate 22.

In step S12, in response to the command, the bridge crane 41 moves the fetching unit 42 to the dropping location, so as to place the object holder 3 onto the storage plate 22.

Using the operations above, the control unit 5 is configured to move an object 7 that is just processed by one of the machine tools 1 from the base plate 12 of the one of the machine tools 1 to one of the storage plates 22 of the storage unit 2.

On the other hand, when the working dataset, the plurality of base plate datasets and the plurality storage datasets indicate that the object holder 3 is placed on one of the storage plates 22, that the object 7 has not been processed and that one of the base plates 12 is available for placing the object holder 3, the control unit 5 is configured to operate in a second mode.

Specifically, in the second mode, the control unit 5 controls the bridge crane 41 to move the fetching unit 42 to the one of the storage plates 22 at which the object holder 3 is located, controls the fetching unit 42 to secure the object holder 3, moves the fetching unit 42 along with the object holder 3 to the one of the base plates 12, and controls the fetching unit 42 to release the object holder 3 onto the one of the base plates 12. It is noted that the operations in the second mode are similar to those as depicted in the first mode, and details thereof are omitted herein for the sake of brevity.

Using the operations above, the control unit 5 is configured to move an object 7 that is in the storage unit 2 and that is not processed yet from the storage unit 2 to one of the base plates 12 that is currently available for processing the object 7.

In another case, when the working dataset, the plurality of base plate datasets and the plurality storage datasets indicate that the object holder 3 is placed on one of the base plates 12, that the object 7 has not been completely processed and that another one of the base plates 12 is available for placing the object holder 3, the control unit 5 is configured to operate in the third mode.

Specifically, in the third mode, the control unit 5 controls the bridge crane 41 to move the fetching unit 42 to the one of the base plates 12 at which the object holder 3 is located, controls the fetching unit 42 to secure the object holder 3, moves the fetching unit 42 along with the object holder 3 to the another one of the base plates 12 and controls the fetching unit 42 to release the object holder 3 onto the another one of the base plates 12. It is noted that the operations in the third mode are similar to those as depicted in the first mode, and details thereof are omitted herein for the sake of brevity.

Using the operations above, the control unit 5 is configured to move an object 7 that is on one of the machine tools 1 and that is not completely processed to another one of machine tools 1 for further processing. In some embodiments, the machine tools 1 may be configured to perform different machining operations, and processing of the object 7 may require a plurality of machining operations to be completed. After one of the machining operations is completed, the control unit 5 may operate in the third mode to move the object 7 on the object holder 3 to another one of the machine tools 1 for further processing.

To sum up, the embodiments of the disclosure provide a management system for loading an object onto a machine tool and unloading an object from the machine tool. The control unit 5 is configured to receive various parameters to determine a current location of each of the object holders 3 and a status of the object 7 thereon. Then, the control unit 5 is configured to control the bridge crane 41 to move the object holders 3 among the base plates 12 and the storage plates 22. As such, the efficiency of the management system may be increased without operators operating the hoist machines even if there are a large number of machine tools 1 in the management system.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A management system for loading and unloading an object, comprising:
    a plurality of machine tools, each including a base plate;
    a storage unit including a plurality of storage plates;
    an object holder detachably connected to one of said plurality of base plates and said plurality of storage plates, said object holder being configured to enable an object to be placed thereon;
    a conveying unit including
        a fetching unit that is configured to secure or release said object holder, and
        a bridge crane that is configured to move said fetching unit among a plurality of predetermined locations, each of the predetermined locations being associated with one of said base plates and said storage plates; and
    a control unit coupled to said plurality of machine tools, said storage unit and said conveying unit, and configured to
        control said bridge crane to move said fetching unit to one of the predetermined locations at which said object holder is located, and control said fetching unit to secure said object holder, and
        control said bridge crane to move said fetching unit along with said object holder to another one of the predetermined locations at which said object holder is to be moved, and control said fetching unit to release said object holder onto one of said base plates and said storage plates.

2. The management system of claim 1, wherein said conveying unit further includes an object sensor module that is configured to determine whether said object holder is placed on said fetching unit.

3. The management system of claim 1, wherein:
said control unit is configured to receive
- a working dataset including a current location of said object holder and a status of the object thereon,
- a plurality of base plate datasets, each being associated with a state of one of said base plates regarding whether said object holder is placed thereon, and
- a plurality of storage datasets, each being associated with a state of one of said storage plates regarding whether said object holder is placed thereon; and said control unit is configured to operate, based on the working dataset, the plurality of base plate datasets and the plurality of storage datasets, in one of the following modes:

when the working dataset, the plurality of base plate datasets and the plurality of storage datasets indicate that said object holder is placed on one of said base plates, that the object has been processed and that one of said storage plates is available for placing said object holder, a first mode, in which said control unit controls said bridge crane to
- move said fetching unit to the one of said base plates at which said object holder is located,
- control said fetching unit to secure said object holder,
- move said fetching unit along with said object holder to the one of said storage plates, and
- control said fetching unit to release said object holder onto the one of said storage plates;

when the working dataset, the plurality of base plate datasets and the plurality of storage datasets indicate that said object holder is placed on one of said storage plates, that the object has not been processed and that one of said base plates is available for placing said object holder, a second mode, in which said control unit controls said bridge crane to
- move said fetching unit to the one of said storage plates at which said object holder is located,
- control said fetching unit to secure said object holder,
- move said fetching unit along with said object holder to the one of said base plates, and
- control said fetching unit to release said object holder onto the one of said base plates; and when the working dataset, the plurality of base plate datasets and the plurality of storage datasets indicate that said object holder is placed on one of said base plates, that the object has not been completely processed and that another one of said base plates is available for placing said object holder, a third mode, in which said control unit controls said bridge crane to
- move said fetching unit to the one of said base plates at which said object holder is located,
- control said fetching unit to secure said object holder,
- move said fetching unit along with said object holder to the another one of said base plates, and
- control said fetching unit to release said object holder onto the another one of said base plates.

4. The management system of claim 3, wherein said storage unit further includes a sensor module configured to detect, with respect to each of said storage plates, whether said storage plate has said object holder placed thereon.

5. The management system of claim 1, wherein:
said bridge crane includes
- a first track that is built above said machine tools and said storage unit and that extends along a first horizontal direction,
- a second track that is slidably movable along the first horizontal direction,
- a dropping member that is connected to said second track, and that is configured to be movable along said second track,
- a cable that has one end connected to said dropping member and that is controlled to extend from said dropping member vertically downward or retract along the vertical direction, and
- a hanging member that is connected to another end of said cable and that is removably connected to said fetching unit;

said conveying unit further includes a location sensor module that is configured to detect a current location of said fetching unit and transmit the current location to said control unit; and said control unit further stores a plurality of standard coordinate sets that correspond with the predetermined locations, respectively.

6. The management system of claim 5, wherein:
the current location of said fetching unit includes three coordinates in a three-dimensional coordinate system; and
two of the coordinates are determined by said location sensor module detecting a horizontal distance and a relative direction to a reference object with respect to the horizontal directions, and a third one of the coordinates is determined by said location sensor module detecting a drop distance of said fetching unit from said dropping member.

7. The management system of claim 5, wherein:
said fetching unit includes a frame that has two ends, a buckle disposed on one end of said frame for connecting said fetching unit to the hanging member, and a fork structure that extends from another end of said frame and that is for holding said object holder;

said fetching unit is controlled by the said bridge crane to move to one of a plurality of dropping locations that is associated with one of the predetermined locations and that is indicated by a dropping coordinate set of the corresponding location dataset, and to one of a plurality of pick-up locations that is associated with the one of the predetermined locations and that is higher than a corresponding one of the dropping locations and that is indicated by the pick-up coordinate set of the corresponding location dataset;

when moved to the one of the plurality of dropping locations, said fork structure of the fetching unit is disposed below said object holder, and is spaced apart from said object holder; and when moved to the one of a plurality of pick-up locations, said dropping member is controlled to retract said cable, such that said fork structure is lifted up to lift said object holder, and then said fetching unit, together with said object holder is lifted vertically away from the one of said base plates.

8. The management system of claim 7, wherein:
said conveying unit further includes a stabilizing module that includes a controlling mechanism disposed on said bridge crane, and an oscillation detecting module disposed on said fetching unit and connected to said control unit;

after said fetching unit is moved to one of the predetermined locations, one of the pick-up locations or one of the dropping locations, said oscillation detecting module is configured to determine movement of said fetching unit and to calculate an oscillation parameter based on the movement; and when it is determined by said control unit that the oscillation parameter is larger than a preset threshold, said controlling mechanism is configured to control the movement of said fetching unit so as to reduce a tension said cable is subjected to until the oscillation parameter drops below the preset threshold.

9. The management system of claim 7, wherein:
said object holder includes an inner part and an outer part that surrounds said inner part, said outer part being formed with a plurality of grooves in a bottom surface thereof;
said fork structure includes a connecting body that is connected to said frame, two branches that extend in parallel from two ends of said connecting body, and a plurality of protrusions formed on said branches;
when said fetching unit is at one of the dropping locations, said protrusions of said fork structure are moved below said grooves, respectively; and
when said fetching unit is at one of the pick-up locations, said protrusions of said fork structure are moved to engage said grooves of said object holder, respectively.

10. The management system of claim 9, wherein:
said inner part of said object holder is formed with a plurality of locating holes in a bottom surface thereof;
each of said base plates includes a plate body and a plurality of protruding members; and
when said object holder is placed on one of said base plates, said protruding members of the one of said base plates extend into said locating holes, respectively, so as to removably secure said object holder on the one of said base plates.

11. The management system of claim 10, wherein:
each of said protruding members includes a protruding part and a plurality of balls, each of said balls being retractably disposed on said protruding part;
each of said engaging parts has a cylinder shape, and has an inner surface which is formed with a ring-shaped groove; and
when said object holder is placed on one of said base plates, said balls on each of said protruding members engage said ring-shaped grooves of a corresponding one of said engaging parts.

* * * * *